Figure 1:
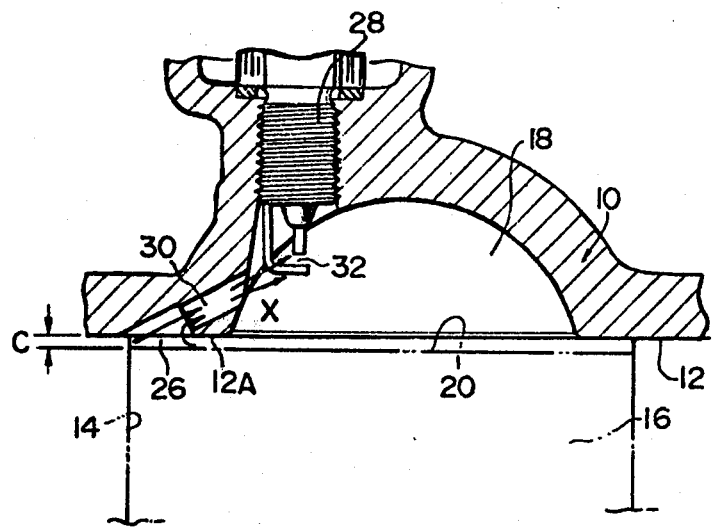

United States Patent [19]

Matsumoto

[11] 4,191,136

[45] Mar. 4, 1980

[54] COMBUSTION CHAMBER OF AN INTERNAL COMBUSTION ENGINE

[75] Inventor: Hiromitsu Matsumoto, Hamamatsu, Japan

[73] Assignee: Yamaha Hatsudoki Kabushiki Kaisha, Iwata, Japan

[21] Appl. No.: 883,827

[22] Filed: Mar. 6, 1978

[51] Int. Cl.² ............................................. F02B 19/16
[52] U.S. Cl. .............................. 123/30 C; 123/193 H; 123/191 S
[58] Field of Search .......... 123/191 S, 191 SP, 32 SP, 123/32 K, 32 L, 30 C, 193 H, 193 CH

[56] References Cited

U.S. PATENT DOCUMENTS

| | | | |
|---|---|---|---|
| 1,782,395 | 11/1930 | Bullington | 123/191 SP |
| 3,799,140 | 3/1974 | Vogelsang et al. | 123/191 S |
| 4,116,191 | 9/1978 | Yanagihara et al. | 123/32 SP |
| 4,119,065 | 10/1978 | Noguchi et al. | 123/32 SP |
| 4,133,331 | 1/1979 | Otsubo et al. | 123/30 C |

FOREIGN PATENT DOCUMENTS

| | | | |
|---|---|---|---|
| 2359058 | 8/1974 | Fed. Rep. of Germany | 123/193 H |
| 2311927 | 5/1976 | France | 123/32 SP |

Primary Examiner—Ira S. Lazarus
Assistant Examiner—Craig R. Feinberg
Attorney, Agent, or Firm—Donald D. Mon

[57] ABSTRACT

A combustion chamber of an internal combustion engine which includes a cylinder bore, a cylinder head with a combustion recess and a mating surface with a surface portion overhanging the bore whereby to form a squash portion between the overhanging portion and a piston in the bore. A spark plug is disposed in the combustion recess, offset toward the squash area. An aperture extends between the squash area and the combustion recess, and is directed toward the electrode of the spark plug.

2 Claims, 2 Drawing Figures

COMBUSTION CHAMBER OF AN INTERNAL COMBUSTION ENGINE

The present invention relates to an improvement in a combustion chamber of an internal combustion engine, more particularly to a combustion chamber of an internal combustion engine which is so arranged that it can serve to enhance the combustion speed of air/fuel mixture in the combustion chamber in order to ensure steady and highly efficient combustion even when the engine is operated with a lean air/fuel mixture.

In recent internal combustion engines, in order to reduce the air pollutant constituents in the exhaust gas it has been broadly practiced to operate the engine with an air/fuel mixture which is as lean as possible. However, engine operation with such lean air/fuel mixture is disadvantageous in general in that it has a tendency to cause unsteady engine operation due to a delay in combustion, and to produce residual unburnt constituents in the inner-most parts of the combustion chamber. Thus, the result is that engine out-put is substantially decreased in comparison with the case where use is made of a rich air/fuel mixture and, moreover, the emission of air pollutant constituents cannot be decreased to a desired extent.

The present invention is intended to solve the above problems and provide a combustion chamber for an internal combustion engine in which the flame propagation rate in the combustion chamber can be increased to such an extent that rapid and uniform combustion can be ensured even when a lean mixture is used so that the amount of unburnt mixture can be decreased and a desired engine output can be maintained.

In order to attain these objects, the combustion chamber of an internal combustion engine according to the present invention comprises a cylinder head which has a combustion recess and a mating surface extending into the cylinder bore at least at a part of the circumference of the combustion recess to provide an overhanging surface portion whereby a squash area is formed between the overhanging surface portion and the upper surface of the piston, a spark plug which is disposed in the combustion recess at a position offset toward the squash area, and a small aperture having one end opening into the squash area on the overhanging surface portion and the opposite end opening into the combustion recess of the cylinder head and directed substantially toward the spark generating section of the spark plug. In this instance, it is preferable that the end of the small passage opening to the squash area is located at the innermost part of the squash area that is in the vicinity of the upper edge of the cylinder bore wall.

Figure 2:
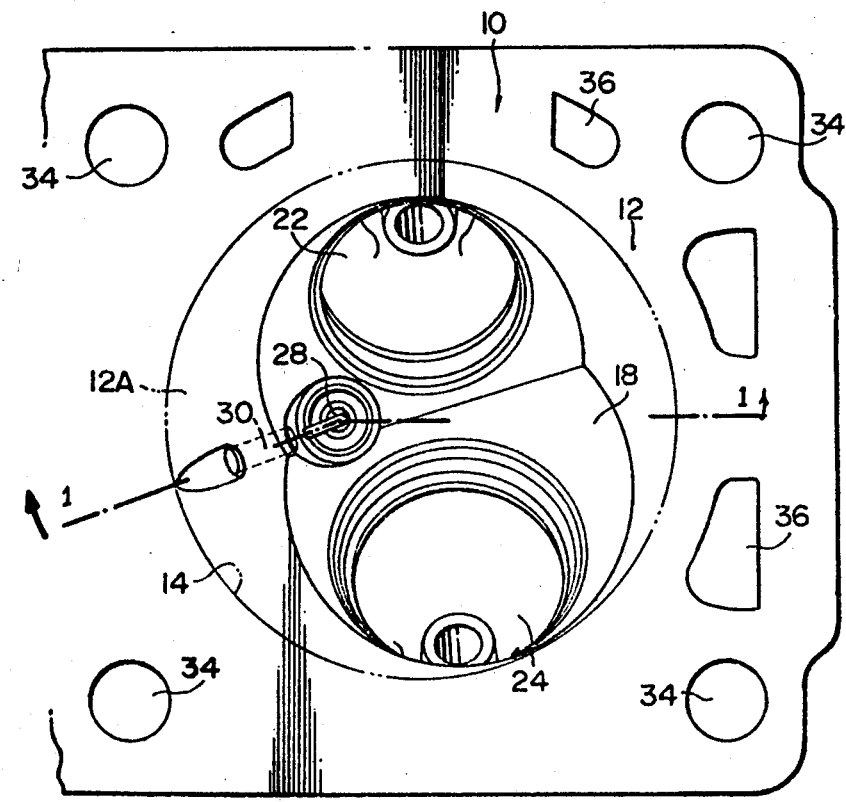

The above and other features of this invention will be fully understood from the following detailed description and the accompanying drawings, in which:

FIG. 1 is a cross-section taken at line 1—1 in FIG. 2, showing the presently-preferred embodiment of the invention; and FIG. 2 is an upward view in FIG. 1.

In FIGS. 1 and 2, a cylinder head 10 of an internal combustion engine is secured at its mating surface 12 to the upper surface of an engine cylinder formed with a cylinder bore 14 with an intervention of a gasket or the like. A piston 16 is received in the cylinder bore 14 for reciprocating movement.

On the under side of the cylinder head 10, there is provided at a portion opposing to the cylinder bore 14 a dome-like multiple domed combustion recess 18 which defines a combustion chamber with the upper surface 20 of the piston 16. In FIG. 1, the upper surface 20 of the piston is shown at the top dead center position in the piston stroke movement. The reference numerals 22 and 24 respectively show an inlet valve mounting space and an exhaust valve mounting space provided in the combustion recess 18.

The mating surface of the cylinder head 10 has an overhanging surface portion 12A which extends in a plane coincident with the mating surface 12 into the cylinder bore 14 so as to surround the combustion recess 18. With the piston at the top dead center, there remains a clearance C (usually 2 to 3 mm) between the piston 16 and the overhanging surface portion 12A. The clearance C serves to define squashing area 26 for squashing air/fuel mixture between the surface portion 12A and the piston upper surface 20 when the piston moves upwardly to the top dead center.

An ignition plug 28 is provided in the combustion recess 18 at a position substantially offset to the squash area 26 from the cylinder axis. Additionally the cylinder head 10 is provided with a small aperture 30 (usually 3 to 5 mm in diameter) for connecting the squash area 26 at a side close to the ignition plug 28 with the combustion recess 18. The small aperture 30 is formed in the direction substantially toward spark generating portion 32 (electrode gap) of the ignition plug 28. Thus, a part of the air/fuel mixture which has been squashed in the area 26 during the upward piston stroke is blown toward the spark generating portion 32 of the ignition plug 28 through the small passage 30 as indicated by arrows X in FIG. 1. In order to ensure intensive flow injection of air/fuel mixture through the small passage, it is preferable that the small aperture is so arranged that its one end opening to the under surface of the cylinder head 10 is positioned as close as possible to the upper edge of the cylinder bore wall that is the innermost part of the squash area 26. The term "innermost" means the region radially farthest removed from the central axis of the cylinder.

In FIG. 2, the reference numeral 34 shows bolt insertion holes for securing the cylinder head 10 to the upper surface of the cylinder, and the reference numeral 36 shows liquid coolant passages of a water jacket.

The present invention has the constitution as above set forth, and there can be attained functions and advantageous effects as mentioned hereunder.

In an internal combustion engine, the ignition timing is usually so selected that the ignition spark is generated at a crank angle of 30 degrees before the top dead center to produce a flame kernel around the sparking electrodes 32. When the piston 16 moves upwardly to a crank angle about 10 degrees before the top dead center and the flame kernel has started to grow up in the air/fuel mixture in the combustion chamber, intensive flow of air/fuel mixture is formed passing through the small passage 30 from the squash area 26 and then injected into the combustion recess 18 toward the ignition spark generating area as shown by arrows X in FIG. 1. Thus, the flame kernel which has already grown up will be widely dispersed in the direction toward the opposite side (rightward direction in FIG. 1.) The flame particles which have been thus dispersed will reach various parts in the combustion chamber so that combustion is rapidly extended throughout the combustion chamber.

Due to such combustion, the pressure in the combustion chamber increases to the maximum value which takes place at the crank angle of about 5 degrees after the top dead center. Meanwhile, the pressure in the squash area 26 becomes higher than that in the combustion recess 18 before the pressure in the combustion chamber reaches the maximum value, so that the flame particles will flow in the inverse direction through the small aperture 30 into the squash area 26. Thus, the flame propagates to and ignites such part of the air/fuel mixture which is in the squash area 26 where combustion is otherwise apt to be delayed. Thus, there is least possibility that unburnt materials will be produced.

In this instance, it is preferable that the end of the small passage 30 open to the squash area 26 is positioned at the most inner section thereof, that is, in the vicinity of the upper edge of the cylinder bore wall 14 as shown in FIG. 1. Due to this arrangement it is possible to eliminate residual unburnt components in the inner section of the squash area 26.

Additionally, it is preferable to utilize a spark plug with substantially projecting electrodes into the combustion chamber for the reason that the flame kernel can be initially generated at a position substantially apart from the inner wall surface of the combustion recess 18 and the flame kernel may be more rapidly and more widely dispersed.

This invention is not to be limited by the embodiments shown in the drawings and described in the description which are given by way of example and not of limitation, but only in accordance with the scope of the appended claims.

I claim:

1. A combustion chamber for an internal combustion engine cylinder which has a cylinder bore with an axis and a piston axially reciprocably mounted in said cylinder bore, said combustion chamber comprising: a cylinder head with a combustion recess, a mating surface on said cylinder head overhanging into the cylinder bore at least at a part of the circumference of the combustion recess to provide an overhanging surface portion whereby a squash area is formed between said overhanging surface portion and the upper surface of the piston, said combustion recess being dome-like and facing into said cylinder bore, and a spark plug disposed in the cylinder head at a position radially offset from said axis with a spark generating section disposed in said cylinder recess, said cylinder head having an aperture with one of its ends opening into the squash area on the overhanging surface portion and its other end opening into the combustion recess of the cylinder head and directed substantially at said spark generating section of the spark plug.

2. A combustion chamber of an internal combustion engine according to claim 1, wherein the one end of the aperture opening into the squash area is located adjacent to the upper edge of the cylinder bore wall.

* * * * *